UNITED STATES PATENT OFFICE 2,324,935

PROCESS FOR POLYMERIZING DERIVATIVES OF METHACRYLIC ACID

Carl T. Kautter, Darmstadt, and Ernst Trommsdorff, Jugenheim - on - the - Bergstrasse, Germany, assignors to Röhm & Haas Company, Philadelphia, Pa.

No Drawing. Application May 13, 1939, Serial No. 273,586. In Germany May 20, 1938

8 Claims. (Cl. 260—83)

This invention relates to a process for polymerizing methacrylic acid and its functional derivatives. It relates more particularly to a process whereby polymers can be obtained which when dissolved in a suitable solvent yield solutions of relatively low viscosity.

It is known that methacrylic acid and its functional derivatives such as the esters, amides, nitrile, anhydride, acid halides, etc. may be polymerized in the presence of catalysts such as organic peroxides and that the degree of polymerization, as measured by the viscosity of solutions of the polymer, may be varied by varying the amount of catalyst. Small amounts of catalyst yield polymers of high degree of polymerization which when dissolved in suitable solvents give solutions of high viscosity, whereas large amounts of catalyst yield polymers of low degree of polymerization. It is thus possible to control the degree of polymerization within certain limits. In order to prepare polymers which yield solutions of low viscosity such as are required for coating compositions relatively large amounts of catalyst are necessary. In such cases the process has several disadvantages. On the one hand, the large amount of catalyst brings about a violent reaction and, on the other, the reduction of degree of polymerization cannot be accurately enough controlled to give products of reproducible viscosity. Furthermore, when the polymerization is carried out in a dispersing medium such as water, it is not possible to reduce the degree of polymerization to any marked extent by increasing the amount of catalyst.

It has been found that the above-described disadvantages can be eliminated and methacrylic polymers of low degree of polymerization prepared by polymerizing methacrylic acid or any of its functional derivatives in the presence of small amounts of unsaturated chlorinated hydrocarbons. Generally speaking, the amount of the unsaturated chlorinated hydrocarbon required to achieve the object of the invention is less than about 5% by weight of the polymerizable derivative of methacrylic acid.

Chlorinated unsaturated compounds which are effective in yielding methacrylic polymers of low degree of polymerization are, for example, allyl chloride, 2-methyallyl chloride, sym-dichloro-ethylene, trichloro-ethylene, 1,2-dichloro-propylene, β-chloroacryllic acid, etc. Compounds obtained by the treatment of these substances with peroxides such as benzoyl peroxide, for example dim, sym-dichloro-ethylene, may also be used. Compounds, such as vinyl chloride, vinylidence chloride, α-chloracrylic acid, etc., do not have the property of yielding methacrylic polymers of low degree of polymerization.

The polymerization of the methacrylic derivatives can be carried out in the usual manner by application of heat, exposure to light, under pressure or in the presence of catalysts, particularly peroxides. It may also be carried out in solution or the monomer containing the unsaturated chlorinated compound may be emulsified in water with the help of small amounts of emulsifying agents and exposed to polymerizing influences. Particularly good results are obtained in the polymerization of the emulsified compounds.

Joint polymers of methacrylic derivatives and minor amounts of other polymerizable materials may be prepared. Such other polymerizable materials are acrylic acid and its functional derivatives, vinyl esters, styrene, etc.

When pure acrylic acid derivatives are polymerized in the presence of the chlorinated unsaturated compounds, the effect is very much less and no advantage over other known processes is obtained. Apparently the action of these chlorinated compounds in the polymerization of methacrylic derivatives is specific to these particular polymerizable compounds.

The invention is illustrated by the following examples but is not limited to the exact materials disclosed as it may be otherwise practiced within the scope of the appended claims.

Example 1

Several samples of methyl methacrylate were polymerized in the presence of 0.01% of benzoyl peroxide and 1% of various chlorinated unsaturated hydrocarbons and the resulting polymer made up to a 10% solution in ethyl acetate. The viscosities of these solutions were then measured and the following results obtained:

| Chlorinated compound: | Centipoises |
|---|---|
| None | > 1,500,000 |
| Trichloro-ethylene | 152,000 |
| Sym-dichloro-ethylene (B. P. 59° C.) | 144,105 |
| Sym - dichloro - ethylene (B. P. 47–48° C.) | 143,105 |
| Allyl chloride | 41,340 |
| 2-methylallyl chloride | 105.5 |

Analogous compounds containing no chlorine do not have this effect. 1% of allyl alcohol, for example, gave a polymer having a viscosity of 1,155,300 centipoises in 10% solution in ethyl acetate.

Example 2

Methyl methacrylate was polymerized in the presence of 0.02% of benzoyl peroxide and 1% of various chlorinated unsaturated hydrocarbons. The polymer was made up to a 10% solution in a mixture of equal parts of ethyl acetate, acetone, and monochlorobenzene. Viscosity measurements of these solutions gave the following results. In this and the following examples the relative viscosity is the ratio of the viscosity of the solution to that of the solvent, the solution used containing 10% of the polymerization product.

| Chlorinated compound: | Relative viscosity |
|---|---|
| Trichloro-ethylene | 3.24 |
| Sym-dichloro-ethylene (B. P. 59° C.) | 3.3 |
| Sym-dichloro-ethylene (B. P. 47–48° C.) | 4.1 |
| Dim-sym-dichloro-ethylene | 16.4 |

Corresponding saturated chlorine-containing compounds have a much less effect. For example, a 10% solution of methyl methacrylate polymerized as above in the presence of 1% of ethylene dichloride, when dissolved in a mixture of equal parts of ethyl acetate, acetone and monochlorobenzene, had a relative viscosity of 478.0.

The amount of chlorinated unsaturated compound used also affects the degree of polymerization as shown by the following table, for methyl methacrylate polymerized as above.

| Chlorinated compound: | Relative viscosity |
|---|---|
| 0.2% dim-sym-dichloro-ethylene | 62.5 |
| 0.5% dim-sym-dichloro-ethylene | 50.7 |
| 1.0% dim-sym-dichloro-ethylene | 16.4 |
| 2.0% dim-sym-dichloro-ethylene | 5.3 |
| 5.0% dim-sym-dichloro-ethylene | 2.3 |
| 0.2% 2-methylallyl chloride | 4.9 |
| 2.0% 2-methylallyl chloride | 1.3 |

Example 3

100 g. of monomeric methyl methacrylate containing 1.0% of benzoyl peroxide and 0.5% of 2-methyl allyl chloride is dispersed in 400 g. of water containing 3 g. of finely divided magnesium carbonate. The ester is polymerized by heating the emulsion to 70–72° C. for 1.5 hours. The polymer is obtained in the form of granules, a 10% solution of which in ethyl acetate has a relative viscosity of 4.6. If 1.0% of 2-methylallyl chloride is used, the resulting polymer yields a 10% solution in ethyl acetate having a relative viscosity of 4.0. If the 2-methylallyl chloride is omitted and the methyl methacrylate polymerizaed in the same manner a 10% solution of the polymer will have a relative viscosity of more than 1100.

Example 4

500 g. of monomeric ethyl methacrylate containing 1.0% of benzoyl peroxide and 0.5% of 2-methylallyl chloride was dispersed in 1200 g. of water containing 2 g. of finely dispersed magnesium carbonate. The emulsion was heated 1.5 hours at 70–75° C. and the polymer obtained in the form of granules. A 10% solution of this polymer in ethyl acetate had a relative viscosity of 3.5.

We claim:

1. The process of preparing, from esters of methacrylic acid, polymers which yield solutions of relatively low viscosity, which comprises polymerizing the monomeric ester in the presence of from about 0.2% to about 5% of a chlorinated, unsaturated, aliphatic compound from the group consisting of allyl chloride, 2-methallyl chloride, sym-dichloroethylene, trichloroethylene, 1,2-dichloropropylene and dim. sym-dichloroethylene.

2. The process of preparing a polymeric methyl methacrylate that yields solutions of relatively low viscosity, which comprises polymerizing monomeric methyl methacrylate in the presence of from about 0.2% to about 5% of a chlorinated, unsaturated, aliphatic compound from the group consisting of allyl chloride, 2-methallyl chloride, sym-dichloroethylene, trichloroethylene, 1,2-dichloropropylene and dim. sym-dichloroethylene.

3. The process of preparing a polymeric methyl methacrylate that yields solutions of relatively low viscosity, which comprises polymerizing monomeric methyl methacrylate in the presence of from about 0.2% to about 5% of 2-methylallyl chloride.

4. The process of preparing, from esters of methacrylic acid, polymers which yield solutions of relatively low viscosity which comprises dispersing in water the monomeric ester of methacrylic acid containing from about 0.2% to about 5% of a chlorinated, unsaturated, aliphatic compound from the group consisting of allyl chloride, 2-methallyl chloride, sym-dichloroethylene, trichloroethylene, 1,2-dichloropropylene and dim. sym-dichloroethylene, and subjecting said dispersion to polymerizing influences.

5. The process of preparing, from methyl methacrylate, polymers which yield solutions of relatively low viscosity which comprises dispersing in water the monomeric methyl methacrylate containing from about 0.2% to about 5% of a chlorinated, unsaturated, aliphatic compound from the group consisting of allyl chloride, 2-methallyl chloride, sym-dichloroethylene, trichloroethylene, 1,2-dichloropropylene and dim. sym-dichloroethylene, and subjecting said dispersion to polymerizing influences.

6. The process of preparing, from methyl methacrylate, polymers which yield solutions of relatively low viscosity which comprises dispersing in water the monomeric methyl methacrylate containing from about 0.2% to about 5% of 2-methallyl chloride and subjecting said dispersion to polymerizing influences.

7. The process of preparing, from polymerizable compounds of the group consisting of methacrylic acid, esters, nitrile and anhydride, polymers which yield solutions of relatively low viscosity, which comprises polymerizing the monomeric compound in the presence of from about 0.2% to about 5% of a chlorinated, unsaturated, aliphatic compound from the group consisting of allyl chloride, 2-methallyl chloride, sym-dichloroethylene, trichloroethylene, 1,2-dichloropropylene and dim. sym-dichloroethylene.

8. The process of preparing, from polymerizable compounds of the group consisting of methacrylic acid, esters, nitrile and anhydride, polymers which yield solutions of relatively low viscosity, which comprises dispersing in water the monomeric compound containing from about 0.2% to about 5% of a chlorinated, unsaturated, aliphatic compound from the group consisting of allyl chloride, 2-methallyl chloride, sym-dichloroethylene, trichloroethylene, 1,2-dichloropropylene and dim. sym-dichloroethylene, and subjecting said dispersion to polymerizing influences.

CARL T. KAUTTER.
ERNST TROMMSDORFF.